3,000,793
PRODUCTION OF COBALAMINS
Lloyd E. McDaniel, Plainfield, N.J., assignor to Merck
& Co., Inc., Rahway, N.J., a corporation of New Jersey
No Drawing. Continuation of application Ser. No.
512,875, June 2, 1955. This application Jan. 22, 1957,
Ser. No. 635,087
5 Claims. (Cl. 195—114)

This invention relates to the production of therapeutically and nutritionally valuable substances by fermentation, and in particular to improved nutrient mediums for the microbiological production of vitamin substances having LLD activity or growth promoting properties for the microorganism *Lactobacillus lactis* Dorner.

This application is a continuation of copending application Serial No. 512,875, filed June 2, 1955.

Vitamin substances having LLD or APF activity are produced by fermentation of nutrient mediums by selected strains of various species of the subphylum fungi and particularly by the Schizomycetes. The potency of broths resulting from the fermentation of the usual nutrient mediums by such organisms, however, is small in comparison with the potency of the pure vitamin substances. Such broths vary in their content of LLD active substances, depending upon the species of fungus employed, but ordinarily contain LLD activity equivalent to a vitamin $B_{12}$ content of the order of 0.00003 mg./ml. Recently it has been discovered that the addition of sources of cobalt and cyanide to the fermentation mediums results in an excellent increase in yield of LLD active substances equivalent, depending upon the microorganism, to a vitamin $B_{12}$ content of the order of 0.0006 mg./ml. The concentration and yield of LLD and APF active substances, however, still remains small.

Another factor which limits the yield is the difficulty which is encountered in separating pure vitamin $B_{12}$ or LLD or APF active concentrates of high activity from the large amounts of impurities present in the fermentation mediums. This difficulty is due to the low concentration of LLD active substances which are obtained. The low yield of LLD active substances has the effect that the cost of this beneficial vitamin substance remains high. It has therefore been of great importance to find a way of increasing the LLD potency of the fermentation broth and at the same time increasing the concentration of LLD active substances relative to the total broth solids.

A primary object of this invention is to provide a nutrient fermentation medium which increases the yield of LLD active substances. A related object is to provide such a medium which will not impede the recovery of LLD active substances. Other objects and the advantages of the invention will appear hereinafter.

In accordance with the invention, these objects are accomplished by propagating strains of bacteria of the genus Pseudomonas which produce substances having LLD activity or substances commonly referred to as cobalamins in nutrient mediums which contain as a component a 4,5-diamino-1,2-dimethylbenzene compound. The cultivation of these bacteria in the presence of a 4,5-diamino-1,2-dimethylbenzene compound greatly increases the quantities of such substances which are produced by the microorganisms. This results in a final broth of increased LLD and APF activity and also results in a greater increase in the concentration of cobalamine.

The 4,5-diamino-1,2-dimethylbenzene compound has the general formula:

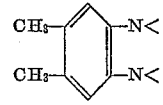

Typical of the compounds embraced in this group are compounds having the formulae:

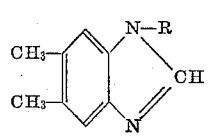
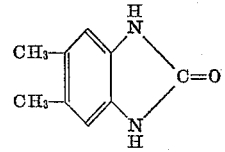

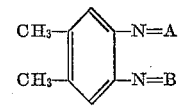

wherein R is hydrogen or a polyhydroxyalkyl or acyl group and A and B are hydrogen, or a group removable by hydrolysis or a carbon-free reducible group, and can be the same or different groups, and can also be linked together to form a ring structure. The acyl group is preferably one having the formula—

wherein R' is an alkyl, aralkyl or aryl group having a chain length of from one to eight carbon atoms. The polyhydroxyalkyl group is preferably a glycoside having a five or six membered ring such as methyl D glucoside; D - fructoside; 1 - α - D - ribofuranosido - 5,6 - dimethylbenzimidazole; 1 - α - D - ribopyranosido - 5,6 - dimethylbenzimidazole; 1 - L - arabinopyranosido - 5,6 - dimethylbenzimidazole; 1 - D - xylopyranosido - 5,6 - dimethylbenzimidazole and 1-β-D-ribopyranosido-5,6-dimethylbenzimidazole. Typical examples of groups removable by hydrolysis are acyl groups such as those defined above. The nitro and nitroso groups are typical of suitable reducible groups. Examples of such compounds are 5,6-dimethylbenzimidazole; N-acetyl-5,6-dimethylbenzimidazole; 4,5 - diamino - 1,2 - dimethylbenzene; 4 - amino - 5 - nitro - 1,2 - dimethylbenzene; N,N' - diacetyl - 4,5 - diamino - 1,2 - dimethylbenzene; 5,6 - dimethylbenzimidazalone; 4 - amino - 5 - nitroso-1,2 - dimethylbenzene; N - acetyl - 5,6 - dimethylbenzimidazole and N-(D-glucosido)-5,6-dimethylbenzimidazole or acid salts therefore such as the hydrochloride, hydrobromide and sulfate. The quantity of the 4,5-diamino-1,2-dimethylbenzene compound present during the fermentation can vary widely depending upon the medium used, but it is ordinarily preferred to use about 0.5 to 100 gammas per milliliter of medium or more desirably from about 5 to 25 gammas per milliliter of medium. The quantity of 4,5-diamino-1,2-dimethylbenzene compound used can all be added to the fermentation medium at one time or the addition can be continuous during the fermentation period.

In a preferred embodiment of the invention even greater yields are obtained by the adding to the fermentation medium substantially pure betaine. The betaine is preferably present in from about 0.1 to about 4% by weight based on the weight of the nutrient medium.

The amount of pure betaine required will be reduced in proportion to the amount of beet molasses present in the medium (although beet molasses should not be present in excess of about 12.5% of the fermentation medium), but not to an extent of below 0.1% by weight and not above a total percent of betaine, including the amount of betaine present in the beet molasses, of approximately 4% by weight. Amounts of betaine in excess of about 4% by weight of the fermentation medium appear to cause no further increase in the yield of LLD active substances. By the term substantially pure betaine is meant betaine which is not contaminated by the undesirable substances commonly contained in beet molasses. Such substances are for example inorganic salts and particularly chlorides.

In carrying out the present invention any of the mediums ordinarily utilized in the propagation of microorganism can be used. The production of LLD activity by a given strain of Pseudomonas can vary depending upon the nutrient medium employed, but in any given type of medium, the presence of the 4,5-diamino-1,2-dimethylbenzene compound will result in an increase in the yield of LLD active substances. The reason for this is not known but apparently this group of organisms is defective in its ability to synthesize, 5,6-dimethylbenzimidazole.

The usual nutrients include a source of carbon, nitrogen, inorganic salts and growth factors when required. The carbon may be provided by a carbohydrate such as dextrose, maltose, xylose, invert sugar, corn syrup, beet molasses and the like. The nitrogen can be provided by an ammonium salt, amino acids or proteins, such as soybeans, oats, yeast, yeast extracts, tryptic digest of casein, meat extract, blood meal, protein meal, and bone scrap, salmon meals, fish meals, fish solubles, distillers solubles and the like. If desired, the microorganism may be propagated using proteins or amino acids without any carbohydrate being present in the medium, in which case the proteins or amino acid may serve as a source of both the carbon and the nitrogen required by the microorganism. The addition of cobalt in any suitable form is also customary to obtain high yields of cobalamine.

The microorganisms to which the fermentation mediums of the invention are suited are included in the genus Pseudomonas. These bacteria in appropriate mediums are far superior in producing LLD active substances than any other microorganism. One species of the group which is particularly effective is Pseudomonas denitrificans. Other strains which can be mentioned are Pseudomonas aeruginosa, Pseudomonas fluorescens, Pseudomonas mildenbergii, Pseudomonas rugosa, Pseudomonas nigrificiens, Pseudomonas salinaria.

The medium is sterilized and the sterile medium containing the desired amount of cobalt is inoculated with a culture of the selected microorganism and the mixture is incubated until the optimum LLD activity is attained. The fermentation is ordinarily conducted for a period of about two to seven days, although shorter or longer times can be employed if desired. The incubation is usually carried out under submerged conditions and at a temperature appropriate for the specific microorganism employed.

The LLD active material can be isolated from the fermentation mixture in crystalline form, if desired, by filtering the fermentation broth and treating the filtered broth with activated charcoal thereby adsorbing the active material. The activated charcoal is eluted with an aqueous solution of pyridine or $\alpha$-picoline and the resulting eluate is evaporated to dryness. The solid concentrate is extracted with a lower, aliphatic alcohol, such as methyl alcohol, and the alcoholic extract is passed through a column packed with activated alumina whereby the active material is adsorbed by the alumina. The column is then developed with fresh lower aliphatic alcohol solvent and those fractions of the eluate which show LLD activity (as determined by microbiological assay) are combined and the combined eluates are concentrated. The concentrated alcoholic solution is then mixed with a liquid miscible with said solution and in which the active substance in insoluble, such as acetone. The precipitate which forms may be further purified by reprecipitation from alcohol by the addition of acetone and the product purified by crystallization from water by the addition of acetone to produce crystalline vitamin $B_{12}$.

The following examples are given for purposes of illustration:

The fermentation mediums listed in Table A were used in the examples.

TABLE A

| | 1 | 2 | 3 |
|---|---|---|---|
| Beet molasses_____percent__ | 6.0 | 6.0 | 8.0 |
| Betaine.$H_2O$_____do____ | | 1.0 | |
| $NH_4NO_3$_____do____ | 0.5 | | |
| $(NH_4)_2HPO_4$_____do____ | 0.2 | 0.2 | 0.4 |
| $Na_2SO_4$_____do____ | 0.2 | 0.2 | 0.2 |
| KCl_____do____ | 0.08 | 0.08 | 0.08 |
| $MgSO_4.7H_2O$_____do____ | 0.05 | 0.05 | 0.05 |
| $MnSO_4.4H_2O$_____do____ | 0.02 | 0.02 | 0.02 |
| $FeSO_4.7H_2O$_____do____ | 0.002 | 0.002 | 0.002 |
| $ZnSO_4.7H_2O$_____do____ | 0.002 | 0.002 | 0.002 |
| $Co(NO_3)_2.6H_2O$_____p.p.m__ | 40 | 40 | 40 |
| pH after sterilization_____ | 7.0–7.2 | 7.0–7.2 | 7.0–7.2 |

*Example 1*

An aqueous fermentation medium was prepared having the composition indicated. The temperature during the fermentation was maintained at 31.5° C. and agitated at the rate of 561 r.p.m. or when betaine was present at the rate of 748 r.p.m. The organism used was a *Pseudomonas denitrificans*. The medium composition and results of the experiments are shown in Table B.

TABLE B

| Run | Medium Composition | Isotope Dilution Assay (gamma/ml.) [1] | Percent Increase of $B_{12}$ |
|---|---|---|---|
| 1 | Medium 1 | 1.9 | |
| 2 | Medium 1+1γ/ml. DMB [2] | 1.78 | |
| 3 | Medium 1+5γ/ml. DMB | 2.35 | 23 |
| 4 | Medium 1+0.5% betaine | 3.18 | |
| 5 | Medium 1+0.5% betaine+5γ/ml. DMB | 4.36 | 37 |
| 6 | Medium 1+1½% betaine | 4.55 | |
| 7 | Medium 1+1½% betaine+1γ/ml. DMB | 5.85 | 28 |
| 8 | Medium 1+1½% betaine+5γ/ml. DMB | 5.90 | 29 |
| 9 | Medium 3 | 2.30 | |
| 10 | Medium 3+5γ/ml. DMB | 3.22 | 40 |
| 11 | Medium 3 | 2.26 | |
| 12 | Medium 3+5γ/ml. DMB | 2.76 | 22 |
| 13 | Medium 3+10γ/ml. DMB | 2.90 | 28 |

[1] Assay according to procedure in Analytical Chemistry, 26, 1146.
[2] DMB indicates 5,6-dimethylbenzimidazole.

*Example 2*

Aqueous fermentation mediums were prepared having the composition of medium No. 1 plus ten gammas per milliliter of 5,6-dimethylbenzimidazole. 12 ml. samples of the mediums were placed in 50 ml. glass vials. Each vial was inoculated with one ml. of *Pseudomonas denitrificans* which was developed on a medium containing 4.5% beet molasses, 0.2% of $(NH_4)_2HPO_4$ and 2.5 parts per million of $Co(NO_3)_2.6H_2O$. The temperature was maintained at 28° C. during the fermentation which was carried out for 70 hours on a rotary shaker. The resulting product was assayed using a LLD cup assay with nitrite pretreatment of the broth. The results are reported in units per milliliter×$10^{-3}$ of LLD activity in Table C.

TABLE C

| Run | Medium 1 (Units/ml. ×N10⁻³) | Medium 1 +DMB (Units/ml. ×N10⁻³) |
|---|---|---|
| 1 | 39 | 48 |
| 2 | 39 | 45 |
| 3 | 41 | 63 |
| 4 | 39 | 50 |
| 5 | 40 | 50 |
| 6 | 38 | 50 |
| 7 | 39 | 51 |
| 8 | 41 | 50 |
| 9 | 41 | 50 |
| 10 | 40 | 49 |
| 11 | 39 | 59 |
| 12 | 39 | 50 |
| 13 | 40 | 41 |
| 14 | 39 | 43 |
| 15 | 41 | 76 |
| 16 | 40 | 66 |
| 17 | 35 | 64 |
| 18 | 38 | 58 |
| 19 | 40 | 53 |
| 20 | 39 | 40 |
| 21 | 41 | 48 |
| 22 | 35 | 49 |
| 23 | 38 | 60 |
| 24 | 40 | 48 |
| 25 | 40 | 55 |
| 26 | 32 | 54 |
| 27 | 42 | 56 |
| 28 | 37 | 58 |
| 29 | 39 | 67 |
| 30 | 35 | 52 |
| 31 | 36 | 48 |
| 32 | 38 | 54 |
| 33 | 34 | 61 |
| 34 | 36 | 52 |
| 35 | 32 | 56 |
| 36 | 34 | 65 |
| 37 | 31 | 59 |
| 38 | 43 | 59 |
| 39 | 35 | 59 |
| 40 | 35 | 52 |
| 41 | 40 | 61 |
| 42 | 34 | 59 |
| 43 | 36 | 69 |
| 44 | 33 | 63 |
| 45 | 33 | 54 |
| 46 | 35 | 54 |
| 47 | 32 | 53 |
| 48 | 36 | 56 |
| 49 | 34 | 49 |
| 50 | 36 | 45 |
| 51 | 32 | 47 |
| 52 | 33 | 44 |
| Average | 37 | 54 |

The control medium averaged 37,000 units/ml. while the medium supplemented with 5,6-dimethylbenzimidazole averaged 54,000 units/ml. by LLD assay; or about 45% increase.

Example 3

A fermentation experiment similar to that described in Example 2 was carried out using a strain of *Pseudomonas denitrificans*. The assay showed the control to produce 29,500 units/ml. of LLD activity whereas the medium supplemented with 10γ/ml. of 5,6-dimethylbenzimidazole gave 43,000 units/ml. which was about a 45% increase.

Example 4

A fermentation experiment similar to that described in Example 3 was carried out using medium No. 3. The assay showed the control to produce 41,000 units/ml. while that with a medium supplemented with 1, 5 and 10γ/ml. of 5,6-dimethylbenzimidazole produced 47,000; 58,000 and 56,000 units/ml. respectively.

Instead of using 5,6-dimethylbenzimidazole for supplementation as described in Example 3, N,N'-diacetyl-4,5-diamino-1,2-dimethylbenzene, 4-amino-5-nitro-1,2-dimethylbenzene and 4,5-diamino-1,2-dimethylbenzene may be employed, respectively, at levels of the order of about 5 to 10γ/ml., to give a yield increase of vitamin $B_{12}$-active substances of the order of 20 to 30%.

Example 5

Fermentation experiments similar to those described in Example 1 were carried out. The results are shown in Table D wherein DMB represents 5,6-dimethylbenzimidazole.

TABLE D

| Run | Medium No. 3 | Isotope Dilution Assay, γ/ml. | Percent of Increase LLD Activity |
|---|---|---|---|
| 1 | | 2.95 | |
| 2 | +1% betaine | 4.01 | 36 |
| 3 | +1% betaine and 5 γ/ml. DMB | 4.98 | 69 |
| 4 | +1% betaine and 10 γ/ml. DMB | 5.30 | 80 |
| 5 | | 1.93 | |
| 6 | +1% betaine | 3.72 | 67 |
| 7 | +1% betaine and 5γ/ml. DMB | 5.54 | 187 |
| 8 | | 2.25 | |
| 9 | +0.5% betaine | 3.0 | 33 |
| 10 | +0.5% betaine and 5γ/ml. DMB | 4.33 | 93 |
| 11 | +1% betaine | 3.92 | 74 |
| 12 | +1% betaine and 5γ/ml. DMB | 4.67 | 107 |
| 13 | +2% betaine | 4.56 | 102 |
| 14 | +2% betaine and 5γ/ml. DMB | 5.80 | 157 |

Any departure from the above description which conforms to the present invention is intended to be included within the scope of the claims.

What is claimed is:

1. A process for producing cobalamins which comprises fermenting a nutrient medium which initially contained about 0.5 to 100 gamma per ml. of medium of a 4,5-diamino-1,2-dimethylbenzene compound, by means of an LLD activity-producing strain of *Pseudomonas denitrificans*.

2. A process for producing cobalamins which comprises fermenting a nutrient medium containing about 5 to 25 gamma per ml. of 4,5-diamino-1,2-dimethylbenzene by means of an LLD activity-producing strain of *Pseudomonas denitrificans*.

3. In a bacteriological process for synthesizing cobalamins by fermenting a nutrient medium by means of a LLD activity-producing strain of *Pseudomonas denitrificans*, the step of adding 5,6-dimethylbenzimidazole.

4. A process for producing cobalamins which comprises fermenting a nutrient medium which initially contained about 0.5 to 100 gamma per ml. of medium of 5,6-dimethylbenzimidazole by means of an LLD activity-producing strain of *Pseudomonas denitrificans*.

5. A process for producing cobalamins which comprises fermenting a nutrient medium containing about 5 to 25 gamma per ml. of 5,6-dimethylbenzimidazole by means of a LLD activity-producing strain of *Pseudomonas denitrificans*.

References Cited in the file of this patent

UNITED STATES PATENTS 2,653,900   Holland _____ Sept. 29, 1953
2,703,302   Rickes et al. _____ Mar. 1, 1955

OTHER REFERENCES

Bernhauer et al.: Angewandte Chemie, vol. 66, No. 24, Dec. 21, 1954, pp. 776–780.

Ford et al.: Biochem. Jour., January 1955, vol. 59, No. 1, pp. 85–93.

Germany, A20,954 IVa/30H, Feb. 2, 1956.

Germany, A19,703 IVa/30H, Mar. 8, 1956.